United States Patent
Ning

(10) Patent No.: US 10,960,502 B2
(45) Date of Patent: Mar. 30, 2021

(54) METAL-CUTTING TOOL, IN PARTICULAR A REAMING TOOL AND METHOD OF MAKING THE SAME

(71) Applicant: Kennametal Inc., Latrobe, PA (US)

(72) Inventor: Li Ning, Pleasant Unity, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 16/537,913

(22) Filed: Aug. 12, 2019

(65) Prior Publication Data
US 2020/0001383 A1    Jan. 2, 2020

Related U.S. Application Data

(62) Division of application No. 15/397,808, filed on Jan. 4, 2017, now Pat. No. 10,486,253.

(51) Int. Cl.
*B23P 15/46* (2006.01)
*B23D 77/00* (2006.01)
*B23D 77/02* (2006.01)

(52) U.S. Cl.
CPC ............ *B23P 15/46* (2013.01); *B23D 77/006* (2013.01); *B23D 77/02* (2013.01); *B23D 2277/46* (2013.01); *B23D 2277/60* (2013.01); *Y10T 408/45* (2015.01); *Y10T 408/5586* (2015.01); *Y10T 408/89* (2015.01)

(58) Field of Classification Search
CPC .. B23D 77/006; B23D 77/02; B23D 2277/46; B23D 2277/60; B23P 15/46; Y10T 408/5586
See application file for complete search history.

(56) References Cited

U.S. PATENT DOCUMENTS

| 3,216,107 A | 11/1965 | Andreasson |
| 3,908,771 A | 9/1975 | Garrett |

(Continued)

FOREIGN PATENT DOCUMENTS

| DE | 8219045 | 1/1983 |
| DE | 102013205026 A1 | 9/2014 |

(Continued)

OTHER PUBLICATIONS

Dec. 26, 2019 Exam Notice.

(Continued)

*Primary Examiner* — Eric A. Gates
(74) *Attorney, Agent, or Firm* — Larry R. Meenan

(57) ABSTRACT

A reaming tool includes a tool body having an axially rearward shank portion and an axially forward cutting portion, the forward cutting portion having at least one peripherally arranged cutting insert. The reaming tool also includes an inlet coolant channel formed in the tool body and an inlet opening at an axially rearward end of the shank portion. An outlet coolant channel is formed in the tool body and is in fluid communication with the inlet coolant channel, wherein the outlet coolant channel defines an outlet opening proximate to the cutting insert. In one particular aspect, at least a portion of the outlet coolant channel is non-linear. A method of making a component of the reaming tool by performing a printing operation on a substrate to form the component is also provided.

16 Claims, 3 Drawing Sheets

(56) References Cited

U.S. PATENT DOCUMENTS

| | | | |
|---|---|---|---|
| 4,573,381 A | 3/1986 | Hyatt | |
| 4,705,435 A | 11/1987 | Christoffel | |
| 5,425,604 A | 6/1995 | Scheer | |
| 5,649,794 A | 7/1997 | Kress | |
| 5,676,499 A | 10/1997 | Tukala | |
| 6,575,672 B1 | 6/2003 | Maier | |
| 6,602,028 B1 | 8/2003 | Lindblom | |
| 7,451,534 B2 | 11/2008 | Kress | |
| 7,775,751 B2 | 8/2010 | Hecht | |
| 8,007,207 B2 | 8/2011 | Rimet | |
| 8,123,442 B2 | 2/2012 | Paul | |
| 8,157,488 B2 | 4/2012 | Schaefer | |
| 8,944,727 B2 | 2/2015 | Nitzsche | |
| 9,114,460 B2 | 8/2015 | Nisikawa | |
| 9,555,480 B2 | 1/2017 | DeLand | |
| 9,724,765 B2 * | 8/2017 | Ach | B23P 15/32 |
| 10,010,948 B1 * | 7/2018 | Hayden | B23C 5/28 |
| 10,105,769 B2 * | 10/2018 | Ach | B23C 5/10 |
| 10,369,636 B2 * | 8/2019 | Ach | B23B 51/06 |
| 10,730,152 B2 * | 8/2020 | Nicolson | B23D 61/18 |
| 2015/0104267 A1 | 4/2015 | Van Doorn | |
| 2015/0298222 A1 * | 10/2015 | Ach | B23B 51/02 407/11 |
| 2015/0336184 A1 | 11/2015 | Aare | |
| 2016/0263665 A1 * | 9/2016 | Mehrotra | B23P 15/34 |
| 2018/0133809 A1 | 5/2018 | Brunner | |
| 2019/0151960 A1 * | 5/2019 | Schmid | B23B 51/0493 |
| 2019/0247935 A1 * | 8/2019 | Bierl | B23B 51/0486 |
| 2020/0001362 A1 * | 1/2020 | Schuster | B22F 3/10 |

FOREIGN PATENT DOCUMENTS

| | | |
|---|---|---|
| EP | 0824050 B1 | 12/2000 |
| GB | 753836 A | 8/1956 |
| JP | 2002273621 A | 9/2002 |
| WO | WO2015055657 | 4/2015 |
| WO | WO2015055660 | 4/2015 |

OTHER PUBLICATIONS

May 17, 2019 Non-Final OA.
Feb. 8, 2019-02-08 Advisory Action Received.
Nov. 30, 2018 Final OA.
Jul. 23, 2018 Non-Final OA.

* cited by examiner

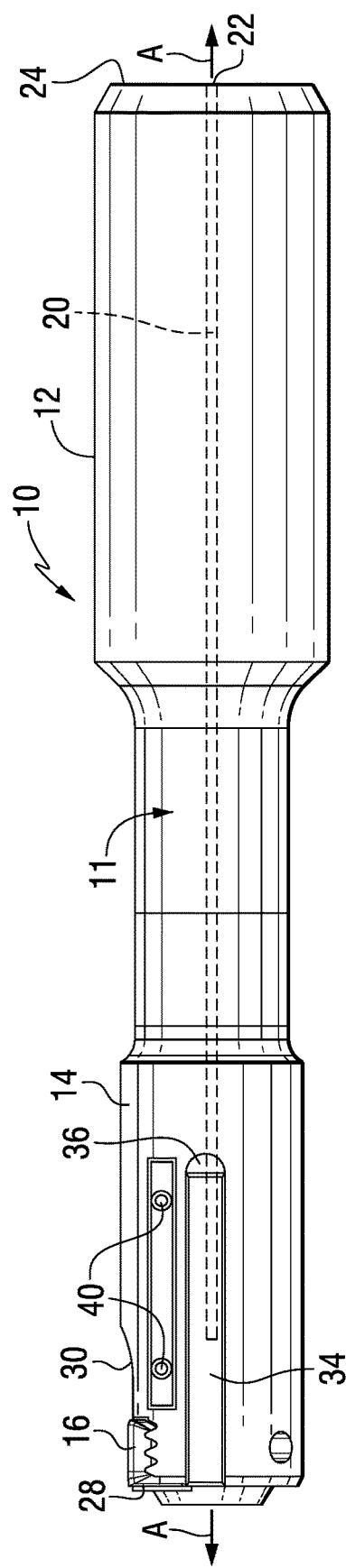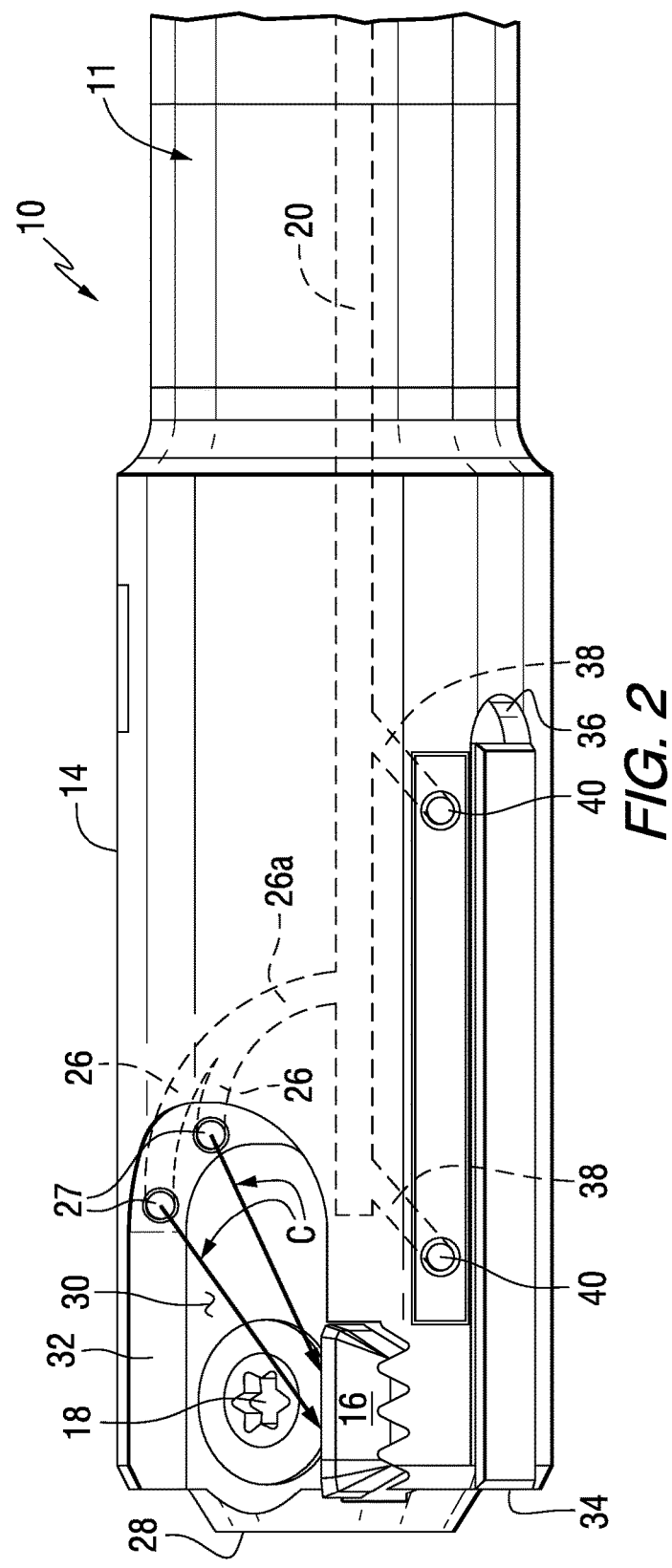

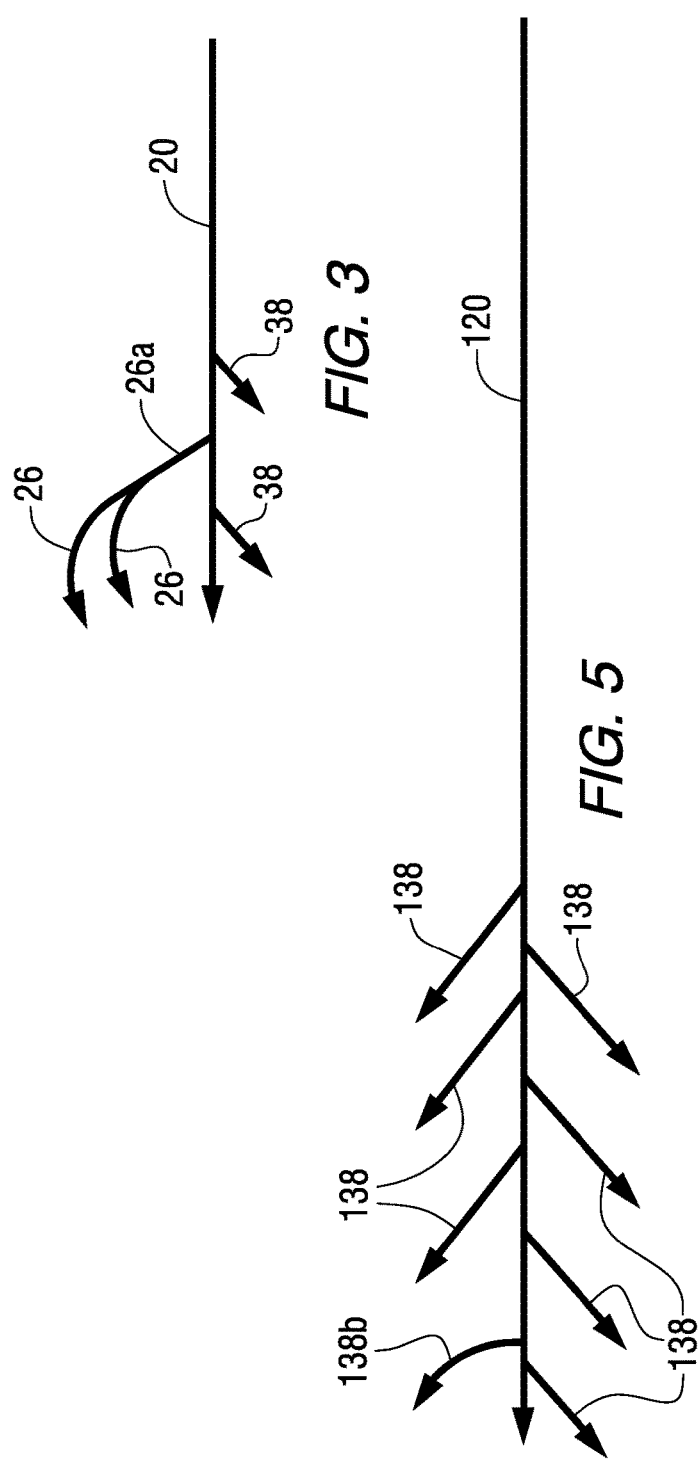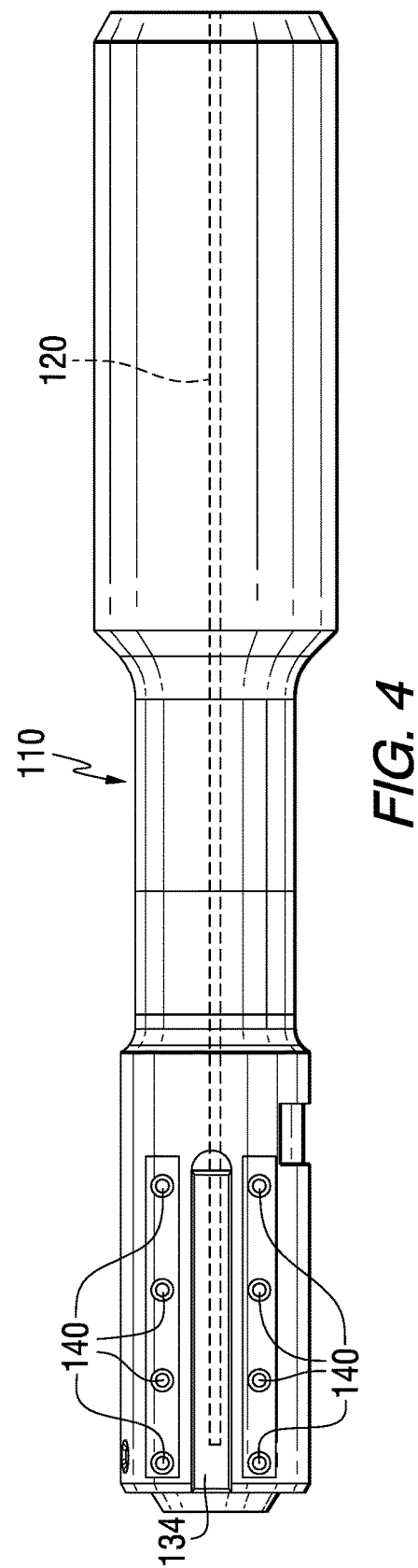

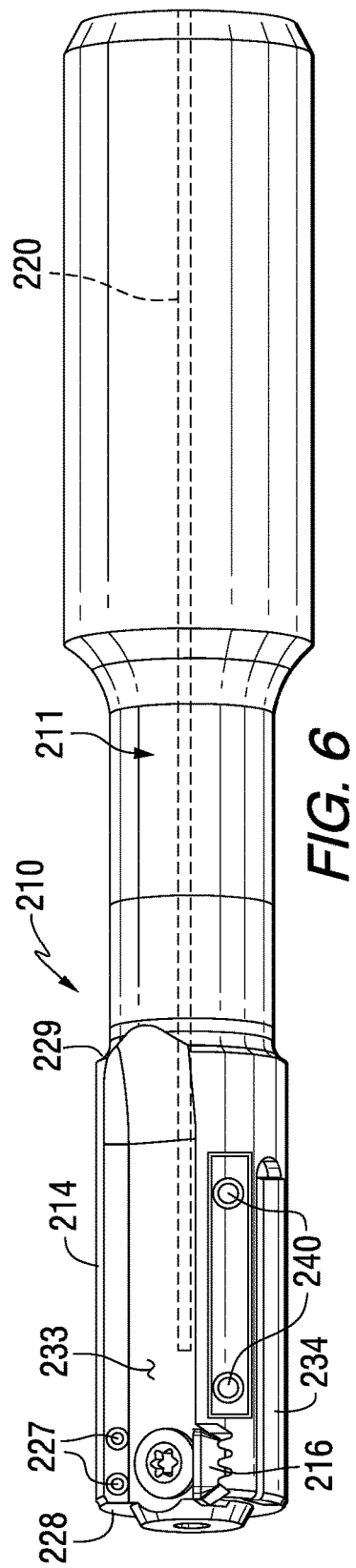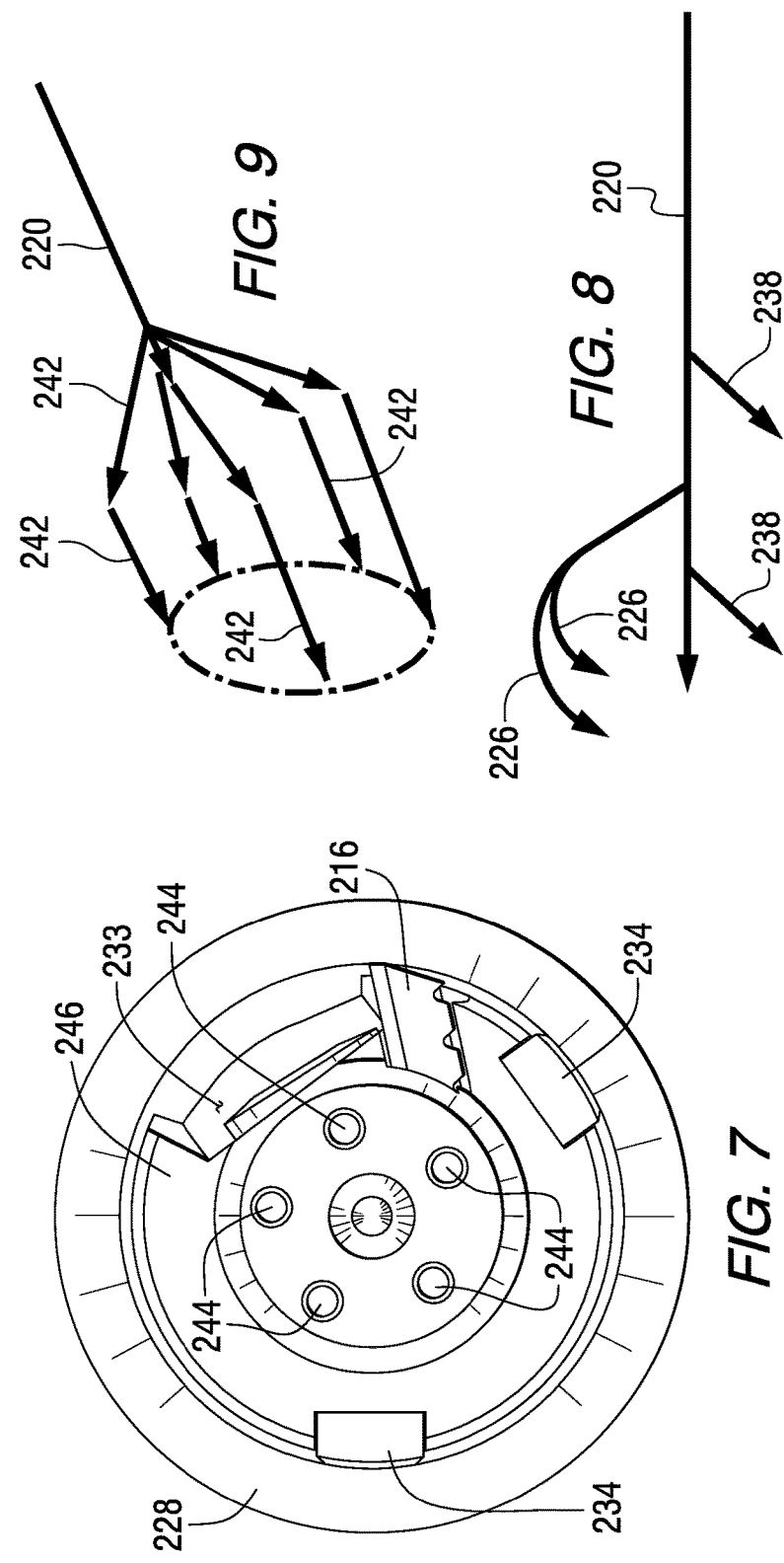

METAL-CUTTING TOOL, IN PARTICULAR A REAMING TOOL AND METHOD OF MAKING THE SAME

CROSS-REFERENCE TO RELATED APPLICATIONS

This application under 35 USC § 120 is a division of co-pending U.S. patent application Ser. No. 15/397,808, filed on Jan. 4, 2017, which is incorporated herein by reference in its entirety.

BACKGROUND OF THE INVENTION

The invention relates to a metal-cutting tool and, in particular a rotary cutting tool and a method of making the same. In one aspect, the rotary cutting tool can be, for example, a reaming tool.

Reamers typically are used for the finishing of boreholes. In this context, highly accurate roundness and straightness, as well as a high surface quality of the inner wall of the bore, are of material importance. In the case of a plurality of simultaneously machined boreholes, a precise coaxiality of a plurality of boreholes is additionally of importance. A typical application is the inner surfaces of bearing components, for example in engines.

In order to obtain the best possible drilling results (roundness, straightness etc.), in reaming tools of this type, which often have only a single reaming cutter, guide elements, usually in the form of bars, are attached to the periphery of a tool main body. The radially outermost points of the guide elements lie at a same radial distance to the center axis and, upon an imaginary rotation about the center axis, define a guide circle. Correspondingly, the cutter, upon rotation about the center axis, defines a cutting circle. The diameter of the guide circle is here consistently smaller than the diameter of the cutting circle.

In the machining operation, the tool is deflected due to the generated metal-cutting forces until the guide elements come to bear against the inner wall of the bore. During such operation of the reaming tool, heat is generated at the interface between the cutting insert and the location where material is being removed from a workpiece (i.e., the insert-workpiece interface) and at the interface between the guide elements and the inner wall of the bore (i.e., the guide element-bore interface). It is well-known that excessive heat at the insert-workpiece interface and the guide element-bore interface can negatively impact upon the useful tool life of the cutting tool and its various components. As can be appreciated, a shorter useful tool life increases operating costs and decreases overall production efficiency. Hence, there are readily apparent advantages connected with decreasing the heat at the insert-workpiece interface and at the guide element-bore interface. Thus, it is known to provide a coolant material to these insert-areas to decrease the heat and increase the useful tool life.

However, it will be appreciated that most known systems for providing a coolant material to the insert-workpiece interface and/or to the guide element-bore interface are difficult and/or expensive to manufacture while still maintaining the overall integrity of the cutting tool components and while also being able to efficiently deliver and direct the coolant material to the desired areas. Thus, it would be desirable to provide an improved metal-cutting tool and, in particular a rotary cutting tool such as, for example, a reaming tool that overcomes limitations, shortcomings and/or disadvantages of known such tools.

SUMMARY OF THE INVENTION

In accordance with an aspect of the invention, a reaming tool includes a tool body having an axially rearward shank portion and an axially forward cutting portion, the forward cutting portion having at least one peripherally arranged cutting insert. The reaming tool also includes an inlet coolant channel formed in the tool body and an inlet opening at an axially rearward end of the shank portion, the inlet coolant channel having a longitudinal axis. Also, an outlet coolant channel is formed in the tool body and is in fluid communication with the inlet coolant channel, wherein the outlet coolant channel defines an outlet opening proximate to the cutting insert. In one particular aspect, at least a portion of the outlet coolant channel is non-linear.

In accordance with another aspect of the invention, a method of making a component of a reaming tool includes providing a substrate and performing a printing operation on the substrate to form the component of the reaming tool on the substrate. The method further includes printing the component to include a cutting area and printing the component to further include an outlet coolant channel proximate to the cutting area, wherein at least a portion of the outlet coolant channel is non-linear.

These and other aspects of the present invention will be more fully understood following a review of this specification and drawings.

BRIEF DESCRIPTION OF THE DRAWINGS

FIG. 1 shows a side elevational view of a reaming tool, in accordance with an aspect of the invention.

FIG. 2 shows an enlarged forward cutting portion view of the reaming tool of FIG. 1, in accordance with an aspect of the invention.

FIG. 3 shows a schematic view of coolant channels of the reaming tool of FIGS. 1 and 2, in accordance with an aspect of the invention.

FIG. 4 shows a side elevational view of an additional reaming tool, in accordance with an aspect of the invention.

FIG. 5 shows a schematic view of coolant channels of the reaming tool of FIG. 4, in accordance with an aspect of the invention.

FIG. 6 shows a side elevational view of an additional reaming tool, in accordance with an aspect of the invention.

FIG. 7 shows a front view of the reaming tool of FIG. 6, in accordance with an aspect of the invention.

FIG. 8 shows a schematic view of coolant channels of the reaming tool of FIGS. 6 and 7, in accordance with an aspect of the invention.

FIG. 9 shows a schematic view of additional coolant channels of the reaming tool of FIGS. 6 and 7, in accordance with an aspect of the invention.

DETAILED DESCRIPTION

Referring to FIGS. 1-3, there is illustrated a metal-cutting tool and, in particular a rotary cutting tool which in one aspect is, for example, a reaming tool 10. The reaming tool 10 includes a tool body 11 that extends along a longitudinal center axis A from an axially rearward shank portion 12 to and axially forward cutting portion 14. In this particular aspect, the reaming tool 10 is a single blade or single-cutter reaming tool that includes a single peripherally arranged cutting insert such as a reaming or finishing cutter 16. As is generally known, the cutting insert 16 can be, for example, soldered to the axially forward cutting portion 14 or exchangeably fastened with the aid of a clamping device 18 as shown in FIG. 2.

The reaming tool 10 further includes an inlet coolant channel 20 formed in the tool body 11 extending along a longitudinal axis and defining an inlet opening 22 at an axially rearward end 24 of the shank portion 12. The inlet coolant channel 20 is configured for providing a coolant material to the cutting portion 14 during a cutting operation.

In order to deliver the coolant material to specific parts or areas of the reaming tool 10, there is further provided at least one outlet coolant channel 26 that is formed in the tool body 11 and in fluid communication with the inlet coolant channel 20. In one aspect, FIGS. 2 and 3 illustrate, for example, two outlet coolant channels 26 being provided, but it will be appreciated that more or less such channels 26 in various configurations and arrangements may be provided as needed or desired. Also, it will be appreciated that the outlet coolant channels 26 illustrated in FIGS. 2 and 3 both branch off an initial coolant channel portion 26a that is directly in communication with the inlet coolant channel 20, but that various other arrangements and configurations could be provided such as, for example, each outlet coolant channel 26 being independently or directly connected to the inlet coolant channel 20. In addition, each coolant channel 26 defines an outlet opening 27 proximate to or adjacent to the cutting insert 16. As will be appreciated, the outlet openings are arranged or configured for directing the coolant material from the outlet coolant channels 26 toward the cutting insert 16, as illustrated by arrows C.

As best illustrated in FIG. 2, an axially forward end 28 of the forward cutting portion 14 includes or defines a chip flute 30 that is arranged or configured adjacent the cutting insert 16. In addition, the chip flute 30 includes a sidewall 32 that extends at least partially about the chip flute 30. In one aspect, the outlet openings 27 are arranged or configured on the sidewall 32 of the chip flute 30.

In accordance with an important aspect of the invention, at least a portion of the outlet coolant channels 26 and/or the initial coolant channel portion 26a is non-linear. In one aspect, at least a portion of the outlet coolant channels 26 and/or the initial coolant channel portion 26a is curved, arcuate or otherwise not entirely linear from where they branch off of the inlet coolant channel 20 to where they end at the outlet openings 27. In another aspect, at least a portion of the outlet coolant channels 26 and/or the initial coolant channel portion 26a is curved, arcuate or otherwise not entirely linear along an axis of flow or direction of flow thereof. Advantageously, this allows for the outlet coolant channels 26 and/or the initial coolant channel portion 26a to be specifically tailored or designed to most effectively be able to transmit the coolant material therethrough and direct the coolant material toward the cutting insert 16 or wherever else it is deemed most desirable to direct the coolant material. It will be appreciated that at least a portion of the inlet coolant channel 20 may also be non-linear, curved and/or arcuate.

In one aspect, the channels 26 and/or 26a may have a generally circular shape or cross-section or other shapes/cross-sections such as, for example, oval, rectangular or square.

In another aspect of the invention, the reaming tool 10 can include at least one peripherally arranged guide element 34 received in a guide element seat 36 on the forward cutting portion 14. The at least one peripherally arranged guide element 34 can be, for example, in the form of longitudinally extending guide bars or guide pads, as is generally known. These are typically soldered in place in the guide element seat 36.

In addition, the reaming tool 10 can include one or more additional outlet coolant channels 38 formed in the tool body 11 and in fluid communication with the inlet coolant channel 20 (see FIGS. 2 and 3). These additional outlet coolant channels 38 define additional outlet openings 40 proximate to the at least one peripherally arranged guide element 34 for directing the coolant material on or toward the guide element 34. It will be appreciated that multiple outlet coolant channels 38 can be provided in various arrangements and configurations as desired. For example, FIGS. 4 and 5 illustrate a reaming tool 110 having an inlet coolant channel 120 in fluid communication with outlet coolant channels 138 having outlet openings 140 that are positioned on both sides of guide element 134 for dispersing the coolant material toward or on to the guide element 134. In another aspect, it will be appreciated that one or more of the outlet coolant channels 38 and/or 138 may be configured to have at least a portion thereof to be non-linear (illustrated, for example, at 138b in FIG. 5). In other words, at least a portion of the outlet coolant channels 38 and/or 138 may be curved, arcuate or otherwise not entirely linear from where they branch off of the inlet coolant channel 20, 120 to where they end at the outlet openings 40, 140. Advantageously, this allows for the outlet coolant channels 38, 138 to be specifically tailored or designed to most effectively be able to transmit the coolant material therethrough and direct the coolant material toward the guide element 34, 134 or wherever else it is deemed most desirable to direct the coolant material.

Referring to FIGS. 6-9, there is illustrated an additional reaming tool 210, in accordance with aspects of the invention. In particular, axially forward cutting portion 214 of reaming tool 210 defines an open chip flute 233 that extends from an axial forward end 228 of the forward cutting portion 214 to or adjacent to an axial rearward end 229 of the forward cutting portion 214. The open chip flute 233 configuration provides for the reaming tool 210 to be generally used in reaming, drilling and/or cutting in blind holes (in contrast to the reaming tool 10 generally being used in through hole operations).

Reaming tool 210 also can include inlet coolant channel 220 in fluid communication with one or more outlet coolant channels 226, with at least a portion thereof being non-linear (see, for example, FIG. 8), for dispersing coolant material through outlet openings 227 toward cutting insert 216, as generally described herein. In addition, one or more additional outlet coolant channels 238 can be provided for directing coolant material to corresponding outlet openings 240 that are adjacent to guide element 234, as generally described herein.

In addition, reaming tool 210 can also include (see, FIGS. 7 and 9) one or more forward coolant channels 242 formed in the tool body 211 and in fluid communication with the inlet coolant channel 220. Each forward coolant channel 242 defines a forward outlet opening 244 in an axially forward face 246 of the cutting portion 214. Advantageously, the coolant channels 242 are more axial in orientation than the channels 226, which are more radial in orientation, which provides coolant material in the hole before the reaming tool 10 enters the hole and assists to push chips rearward in the open chip flute 233 away from the cutting insert 216 during operation.

In another aspect, it will be appreciated that one or more of the outlet forward coolant channels 242 may be configured to have at least a portion thereof to be non-linear. In other words, at least a portion of the outlet forward coolant channels 242 may be curved, arcuate or otherwise not entirely linear from where they branch off of the inlet coolant channel 220 to where they end at the outlet openings 244. Advantageously, this allows for the outlet coolant channels 242 to be specifically tailored or designed to most effectively be able to transmit the coolant material therethrough and direct the coolant material toward the axially forward face 246 or wherever else it is deemed most desirable to direct the coolant material.

In accordance with another aspect of the invention, there is provided a method of making a component of the reaming tools 10, 110, and/or 210 (for which a description generally referring to tool 10 will be set forth herein for simplicity unless otherwise noted). Particularly, the component to be made may generally refer to, for example, the tool body 11, the axially rearward shank portion 12, the axially forward cutting portion and/or combinations thereof as desired.

Specifically, the method of the invention can include the steps of providing a substrate and performing a printing operation on the substrate to form the component of the reaming tool on the substrate. In one aspect, the printing can be accomplished by, for example, an additive manufacturing process. Generally, additive manufacturing (AM) is a technology that can make, manufacture or build 3-dimensional objects by adding layer-upon-layer of a material such as, for example, a metal or metal powder material. Additive manufacturing processes suitable for use with the invention can include, for example, a selective laser melting (SLM) process, binder jetting, electron beam free form (EBFF) manufacturing, laser engineering net shape (LENS) manufacturing, or direct metal laser sintering (DMLS). In one aspect, selective laser melting generally uses 3D CAD data as a digital information source and energy in the form of a high-power laser beam to create three-dimensional metal parts by fusing fine metal powders together. Advantageously, additive manufacturing technologies are able to print small holes, small slots, thin walls and/or curved or non-linear channels which make the embedded complex coolant channels of the invention possible.

In another aspect, the method can further include printing the component to include a cutting area or zone and printing the component to further include an outlet coolant channel proximate to the cutting area or zone, wherein at least a portion of the outlet coolant channels 26 and/or 26*a* is non-linear. In one aspect, at least a portion of the outlet coolant channels 26 and/or 26*a* is printed to be curved, arcuate or otherwise not entirely linear from where they branch off of the inlet coolant channel 20 to where they end at the outlet openings 27. Advantageously, this allows for the outlet coolant channels 26 and/or 26*a* to be specifically tailored or designed to most effectively be able to transmit the coolant material therethrough and direct the coolant material toward the cutting area or zone and, more particularly toward the cutting insert 16 or wherever else it is deemed most desirable to direct the coolant material. As a further advantage, the printing aspect of the manufacturing, as described herein, allows for the desired non-linear aspect of the coolant channels to be possible when compared to more traditional method of manufacturing.

In additional aspects of the method of the invention, the method can include printing the component to include an inlet coolant channel 20 configured to be in fluid communication with the outlet coolant channel 26/26*a*. The method can further include printing the outlet coolant channel 26 to have an outlet opening 27 proximate to the cutting area, printing the cutting area to include an insert seat configured for receiving a cutting insert 16 and/or further including printing the outlet opening 27 to be configured for directing a coolant material towards the insert seat that receives the cutting insert 16.

In other aspects, the method can include printing the component to include a chip flute 32 adjacent to the cutting area, printing the chip flute to be an open chip flute 233 and/or further including printing the component to include a forward coolant channel 242 that defines a forward outlet opening 244 in an axially forward face 246 of the component.

In yet additional aspects of the method of the invention, the method can include printing the component to include a guide element seat 36 configured for receiving a peripherally arranged guide element 34, printing the component to further include an additional outlet coolant channel 38 configured to be in fluid communication with the inlet coolant channel 20 and/or further including printing the additional outlet coolant channel 38 to have an additional outlet opening 40 proximate to the guide element seat 36/guide element 34.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of making a component of a reaming tool, comprising:
   providing a substrate; and
   performing a printing operation on the substrate to form the component of the reaming tool on the substrate, including:
   printing the component to include a cutting area;
   printing the component to further include an outlet coolant channel proximate to the cutting area; wherein at least a portion of the outlet coolant channel is non-linear;
   printing the component to include an inlet coolant channel configured to be in fluid communication with the outlet coolant channel;
   printing the component to include a guide element seat configured for receiving a peripherally arranged guide element; and
   printing the component to include an additional outlet coolant channel formed in the component and in fluid communication with the inlet coolant channel, wherein the additional outlet coolant channel comprises an additional outlet opening proximate to the guide element seat.

2. The method of claim 1, wherein said printing of the component to further include the outlet coolant channel comprises forming the outlet coolant channel to have an outlet opening proximate to the cutting area.

3. The method of claim 2, wherein said printing of the component to further include the cutting area comprises including an insert seat configured for receiving a cutting insert.

4. The method of claim 3, wherein said printing of the component to further include the outlet channel comprises configuring the outlet opening for directing a coolant material towards the insert seat that receives the cutting insert.

5. The method of claim 3, further including printing the component to include a chip flute adjacent to the cutting area.

6. The method of claim 5, wherein said printing of the component to further include the chip flute comprises including an open chip flute that extends from an axial forward end of the component to adjacent an axial rearward end of the component.

7. The method of claim 6, further including printing the component to include a forward coolant channel that defines a forward outlet opening in an axially forward face of the component.

8. The method of claim 7, wherein:
said performing of the printing operation comprises printing the component to include an inlet coolant channel in fluid communication with the outlet coolant channel; and
said printing of the component to include the forward coolant channel comprises forming the forward coolant channel to be in fluid communication with the inlet coolant channel.

9. The method of claim 5, wherein said printing of the component to include the chip flute comprises:
defining a sidewall; and
configuring the outlet opening on the sidewall.

10. The method of claim 2, wherein:
said performing of the printing operation comprises printing the component to include an inlet coolant channel in fluid communication with the outlet coolant channel; and
said printing of the component to further include the outlet coolant channel comprises forming the outlet coolant channel to branch off of the inlet coolant channel and end at the outlet opening.

11. The method of claim 1, further including printing the component to be an axially forward cutting portion of the reaming tool.

12. A component of a reaming tool made by the method of claim 1.

13. The method of claim 1, wherein said printing of the component to further include the outlet coolant channel comprises:
forming the outlet coolant channel to have an outlet opening proximate to the cutting area; and
forming at least a portion of the outlet coolant channel to be curved, arcuate or otherwise not entirely linear from the inlet coolant channel to the outlet opening.

14. The method of claim 1, wherein said performing of the printing operation comprises printing the component to comprise a tool body.

15. The method of claim 14, wherein:
the tool body has an axially rearward shank portion; and
said printing of the component to include the inlet coolant channel comprises:
forming the inlet coolant channel in the tool body; and
defining an inlet opening at an axially rearward end of the shank portion.

16. The method of claim 14, wherein said printing of the component to include the coolant channel comprises forming the outlet coolant channel in the tool body.

* * * * *